(12) United States Patent
Portolan (10) Patent No.: US 11,054,469 B2
(45) Date of Patent: Jul. 6, 2021

(54) INTEGRATED CIRCUIT TEST APPARATUS AND METHOD

(71) Applicant: INSTITUT POLYTECHNIQUE DE GRENOBLE, Grenoble (FR)

(72) Inventor: Michèle Portolan, Saint Julien de Ratz (FR)

(73) Assignee: INSTITUT POLYTECHNIQUE DE GRENOBLE, Grenoble (FR)

( * ) Notice: Subject to any disclaimer, the term of this patent is extended or adjusted under 35 U.S.C. 154(b) by 0 days.

(21) Appl. No.: 16/614,395

(22) PCT Filed: May 17, 2018

(86) PCT No.: PCT/FR2018/051182
§ 371 (c)(1),
(2) Date: Nov. 18, 2019

(87) PCT Pub. No.: WO2018/211218
PCT Pub. Date: Nov. 22, 2018

(65) Prior Publication Data
US 2020/0150177 A1    May 14, 2020

(30) Foreign Application Priority Data
May 19, 2017  (FR) ...................................... 1754491

(51) Int. Cl.
*G01R 31/3177* (2006.01)
*G06F 21/72* (2013.01)

(52) U.S. Cl.
CPC ......... *G01R 31/3177* (2013.01); *G06F 21/72* (2013.01)

(58) Field of Classification Search
CPC .................................................. G01R 31/3177
USPC .................................. 714/735, 737, 734, 740
See application file for complete search history.

(56) References Cited

U.S. PATENT DOCUMENTS

| 5,778,004 A | 7/1998 | Jennion et al. |
| 6,760,904 B1 | 7/2004 | Jennion et al. |
| 9,341,676 B2 * | 5/2016 | Portolan ........ G01R 31/318555 |
| 2001/0016923 A1 * | 8/2001 | Yamashita ....... G01R 31/31903 714/31 |

(Continued)

OTHER PUBLICATIONS

International Search Report and Written Opinion for PCT Patent App. No. PCT/FR2018/051182 (dated Oct. 4, 2018) with English translation of the ISR.

*Primary Examiner* — Fritz Alphonse
(74) *Attorney, Agent, or Firm* — Kenealy Vaidya LLP (57) ABSTRACT

Some embodiments are directed to a test apparatus for testing a device. The apparatus includes a test device having a memory for storing data processing instructions and processors configured, when the data processing instructions are executed, to execute test code in order to implement a test operation on the device being tested. The test code defines test patterns and test algorithms to be applied to instruments for testing the device being tested, and is in a first format that is independent of the test interface between the test device and the device being tested. The apparatus also includes an interface controller coupled to the device being tested and configured to convert communications generated by the test device during the execution of the test code into a second format suitable for the test interface, and to convert communications from the device being tested into the first format.

14 Claims, 4 Drawing Sheets

(56) References Cited

U.S. PATENT DOCUMENTS

2001/0049805 A1   12/2001  Byrd
2003/0099139 A1*  5/2003  Abrosimov ...... G11C 29/56004
                                                             365/200
2013/0193993 A1*  8/2013  Golov .............. G01R 31/31907
                                                           324/750.01
2019/0025367 A1*  1/2019  Vis ....................... G01R 29/105

* cited by examiner

INTEGRATED CIRCUIT TEST APPARATUS AND METHOD

CROSS REFERENCE TO RELATED APPLICATIONS

This application is a national phase filing under 35 C.F.R. § 371 of and claims priority to PCT Patent Application No. PCT/FR2018/051182, filed on May 17, 2018, which claims the priority benefit under 35 U.S.C. § 119 of French Patent Application No. 1754491, filed on May 19, 2017, the contents of each of which are hereby incorporated in their entireties by reference.

BACKGROUND

The present description relates to the field of testing integrated circuits, and in particular automated digital testing.

In the field of automated digital testing, for many years the standard IEEE 1149.1, commonly referred to as the JTAG standard (Joint Test Action Group), has defined the test interface to be used for testing integrated circuits. However, with the changes in the last few years in circuit technology, such as SoC (Systems-on-Chip) and the 3D integration technology, it can be necessary to add capacities in order to allow for a suitable test.

Among the efforts to make progress with test capacities, a new standard IEEE 1687-2014 was developed, commonly referred to as IJTAG (Internal JTAG) and published under the title "IEEE Standard for Access and Control of Instrumentation Embedded within a Semiconductor Device", IEEE, USA, 2014. In relation to the standard IEEE 1149.1, this new standard introduces two notable changes:
  dynamic length analysis strings; and
  the use of instruments through the intermediary of a JTAG string.

Although the experts have given attention to the field of the possibilities made possible by dynamic length analysis strings, relatively little work has focussed on the possibilities of access for instruments. In fact, real functional access to instruments is incompatible with the current test flows based on automated test pattern generation (ATPG).

There is therefore a need in the technique for a solution to generate and apply tests to an integrated circuit that includes access to instruments in a JTAG string.

Another difficulty in the field of the automated test is that, with the constant miniaturisation of circuit elements, the density of the circuits is increasing, and the test strings incorporated into the integrated circuit are becoming increasingly complex. This can cause an increase in the time required for the execution of an automated test. Furthermore, the effective access interface to the circuit is often decided at the very last minute, which forces conventional ATPG to carry out complex conversion operations. There is therefore an additional need to provide a test apparatus and method that allows for a fast execution of an automated test sequence.

SUMMARY

An aspect of the embodiments of the present description is to resolve at least partially one or several problems of the related art.

According to an aspect, a test apparatus for testing a device being tested is provided, with the apparatus including: a test device including a memory for storing data processing instructions and one or more processors arranged, when the data processing instructions are executed: to execute test code in order to implement a test operation on the device being tested, the test code defining one or more test patterns and one or more test algorithms to be applied to instruments for testing the device being tested, the test code being in a first format that is independent of the test interface between the test device and the device being tested; and an interface controller coupled to the device being tested and arranged to convert communications generated by the test device during the execution of the test code into a second format suitable for the test interface, and to convert communications from the device being tested into the first format.

According to an embodiment, the test apparatus includes a plurality of interface controllers implemented by the one or more processors of the test device or by another device, the test device being arranged to select one from the plurality of interface controllers in order to carry out the conversion.

According to an embodiment, the one or more processors of the test device, or one or more other processors of a test generation tool, are arranged to generate the test code before the execution of the test code by the test device.

According to an embodiment, the test apparatus further includes the test interface coupling the interface controller to the device being tested.

According to an embodiment, the test device is arranged to carry out an execution in parallel of a first test algorithm applied to a first of the test instruments and a second test algorithm applied to a second of the test instruments.

According to an embodiment, the one or more processors of the test device are further arranged to access an external library defining one or more other test algorithms for testing a sub-circuit of the device being tested.

According to an embodiment, the one or more processors of the test device are arranged to generate the test code by incorporating the external library into the test code and/or by incorporating into the test code a function call to the one or more other test algorithms.

According to an embodiment, the sub-circuit implements a data or signal processing function, and the one or more other test algorithms are arranged to verify an expected behaviour of the data or signal processing function.

According to an embodiment, the sub-circuit implements a cryptographic function, and the one or more other test algorithms are arranged to provide encryption and/or decryption operations so as to allow the test generation tool to verify the behaviour of the cryptographic function.

According to another aspect, a test system is provided including the aforementioned test apparatus and the device being tested coupled to the test apparatus, the device being tested including a test access port and a plurality of test instruments, with each test instrument including one or more analysis registers.

According to another aspect, a method for testing a device being tested is provided, with the method including: executing, by a test device, of the test code in order to implement a test operation on the device being tested, the test code defining one or more test patterns and one or more test algorithms to be applied to the test instruments of the device being tested, the test code being in a first format that is independent of the test interface between the test generation tool and the device being tested; and during the test phase: converting communications generated by the execution of the test code and intended for the device being tested into a second format adapted to the test interface; and converting communications coming from the device being tested into the first format.

According to an embodiment, the method further includes, before the execution of the test code, the generating of the test code by the test device, or by one or more other processors of a test generation tool.

According to an embodiment, the method further includes the selecting, by the test device, of one from a plurality of interface controllers in order to carry out the conversions.

According to an embodiment, the method further includes the carrying out by the test device of an execution in parallel of a first test algorithm applied to a first of the test instruments and of a second test algorithm applied to a second of the test instruments.

BRIEF DESCRIPTION OF THE FIGURES

These aspects, characteristics and advantages, as well as others, will be disclosed in detail in the following description of particular embodiments given for the purposes of information and in a non-limiting way in relation with the accompanying figures among which.

DETAILED DESCRIPTION OF EXEMPLARY EMBODIMENTS

Figure 1:
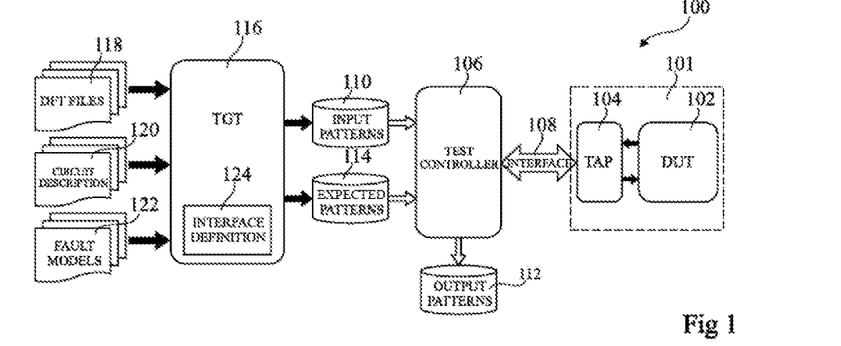
FIG. 1 diagrammatically shows a typical ATPG.

FIG. 1 diagrammatically shows a test apparatus 100 that has been proposed based on the standard IJTAG.

An integrated circuit 101 includes for example a device being tested (DUT) 102, accessed through the intermediary of a test access port (TAP) 104. In the example of FIG. 1, the TAP 104 is integrated into the same chip as the DUT 102, but in alternative embodiments this could be a separate chip.

The TAP 104 communicates for example with a test controller (TEST CONTROLLER) 106 by the intermediary of a test interface (INTERFACE) 108. The test controller 106 executes a test sequence in the DUT 102 based on test patterns (INPUT PATTERNS) 110, which are loaded into the DUT 102 by the intermediary of the TAP 104. For example, the test patterns are sequences of bits which are loaded into a test instrumentation incorporated into the DUT 102, for example by using a boundary analysis operation using BDSL (Boundary Scan Description Language). This entails for example the loading of a functional configuration into the DUT 102 by programming analysis registers based on test patterns, then by allowing the DUT 102 to operate for one or more clock cycles, before retrieving the modified data bits in the analysis registers. The modified data bits are then supplied to the test controller in order to generate output test patterns (OUTPUT PATTERNS) 112, which are for example compared by the test controller 106 to expected test patterns (EXPECTED PATTERNS) 114. If there is a concordance between the output test patterns 112 and the expected test patterns 114, this means that the test was successfully executed. The patterns are sometimes called in the technique "vectors", and in the present description the two terms are used as synonyms.

The input test patterns 110 and the expected test patterns 114 are generated by a test generation tool (TGT) 116 based on various input files. For example, the TGT 116 receives DfT (Design for Test) files (DFT FILES) 118, circuit description files (CIRCUIT DESCRIPTION) 120, and fault models (FAULT MODELS) 122. The DfT files 118 define for example the test instruments incorporated into the DUT 102, which can include analysis registers/switches, BIST (Built-In Self Tests), that can be accessed during an analysis test, etc. The circuit description 120 defines for example the circuit components of the DUT 102, for example in the form of a list of connections. The fault models indicate for example the potential faults that can occur in the circuit design, in such a way that the test patterns can be generated to effectively cover these faults.

In the example of FIG. 1, the TGT 116 is also aware of the test interface (INTERFACE DEFINITION) 124 implemented between the TGT 116 and the DUT 102. In the example of FIG. 1, this interface is a JTAG interface by the intermediary of the test controller 106.

Figure 2:
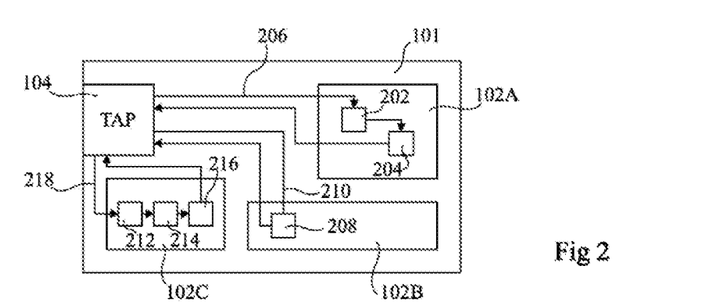
FIG. 2 diagrammatically shows in more detail an integrated circuit of FIG. 1 including a device being tested.

FIG. 2 diagrammatically shows the integrated circuit 101 in more detail according to an embodiment. In this example, the integrated circuit 101 includes, in addition to the TAP 104, three circuit blocks 102A, 102B, 102C formant the DUT 102. The circuit block 102A includes for example test instruments 202 and 204 connected to the TAP 104 by an analysis string 206, the circuit block 102B includes for example a test instrument 208 connected to the TAP 104 by an analysis string 210, and the circuit block 102C includes for example test instruments 212, 214 and 216 connected to the TAP 104 by an analysis string 218.

Now in reference to FIGS. 1 and 2, in order to apply tests to each test instrument 202 to 216, PDL (Procedural Definition Language) is for example used by the TGT 116 to wrap the test vectors and allow for the application thereof by the test controller 106. The vectors wrapped by PDL can be scheduled and merged by the TGT 116, in order to minimise the duration of the test.

The standard IJTAG 1687 also considers a more advanced interaction with the test instrumentation during the test. In particular, the standard IJTAG proposes a functional use, wherein raw instruments can be described, and the PDL can be defined on borders of these instruments. In particular, the PDL language defines input/output values of the instruments, which are then compiled in order to obtain a higher-level vector then a sequence of interface operations. This is commonly known in the technique as "retargeting". The simplest PDL language at level 0 describes for example input/output (I/O) vector operations, while the level 1 PDL language introduces primitive data interfaces that can be used to interface the instruments with algorithms written for example in the dynamic programming language Tcl.

However, in the example of FIG. 1, the TGT 116 is arranged to generate the input test patterns 110 and the expected test patterns 114 in a single step. Once the latter have been generated, the TGT 116 is no longer involved in the test process, and the test controller implements the test based on the PDL file by applying the test patterns to the DUT by the intermediary of the test controller 106. Thus, the flow of the test moves in a single direction, from the TGT 116 to the DUT, and there is no return path to the TGT 116 that allows for the execution of the algorithms that change based on signals coming back from the DUT.

In fact, in the example of FIG. 1, the generation of the test and the application of the test are two different steps in the development of the product, generally carried out by different teams at different locations and at different times. Consequently, the TGT 116 may not even be available when the test controller 106 applies the input patterns 110.

Furthermore, Tcl is intrinsically sequential, and therefore it is difficult and heavy in computing to ensure a simultaneity between the tests of different instruments, which makes it difficult to execute test algorithms in parallel in each instrument.

Another difficulty is that, even if the TGT 116 were authorised to receive data patterns coming back from the DUT 102 and to execute an algorithm in order to dynamically modify the input test patterns 110 during a test phase of the DUT 102, such a test process would be slow and complex, since the TGT 116 should interpret the output patterns based on the particular interface used between the TGT 116 and the DUT 102, and should take account of the definition of interface 124 during the determination of the way to modify the test patterns. Furthermore, the simultaneous execution by the TGT 116 of several test algorithms would be slow since the TGT 116 would frequently be holding for a test to terminate before being able to execute another algorithm for another instrument.

Figure 3A:
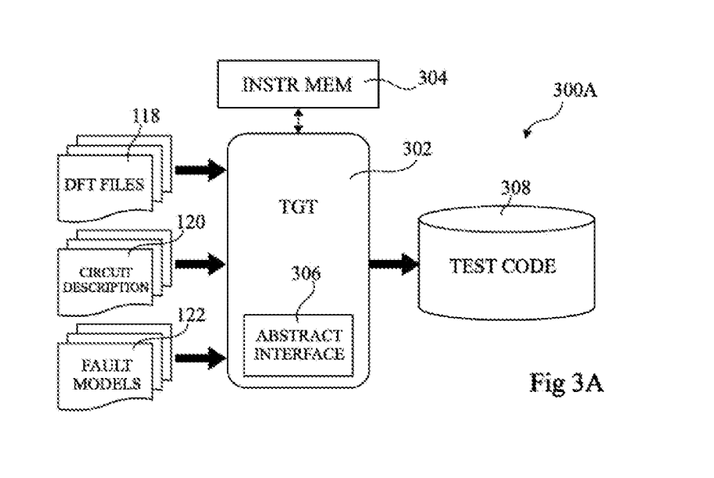
FIGS. 3A and 3B diagrammatically show a test apparatus according to an embodiment of the present description.
Figure 3B:
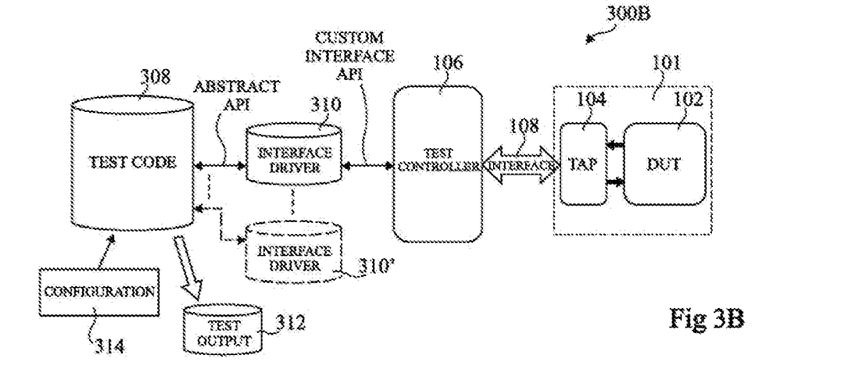

FIGS. 3A and 3B diagrammatically show a test apparatus according to an embodiment that processes at least some of the difficulties described hereinabove in relation with the test apparatus 100 of FIG. 1. Certain elements of the FIGS. 3A and 3B are similar to those of the test apparatus 100 of FIG. 1, and these elements bear the same numerical references and will not be described in detail again.

FIG. 3A diagrammatically shows a module for generating and for executing test code 300A of the test apparatus. This module 300A includes a test generation tool (TGT) 302 which is different from the TGT 116 of FIG. 1 in several aspects described in more detail hereinafter.

As the TGT 116 of FIG. 1, the TGT 302 receives for example DFT files 118, a circuit description 120, and fault models 122, which will not be described again in detail.

The TGT 302 includes for example one or more processors that execute data processing instructions stored in an instruction memory (INSTR MEM) 304. For example, the execution of these instructions leads the one or more processors of the TGT 302 to be configured to generate and execute a test code (TEST CODE) 308 in order to test a DUT (not shown in FIG. 3A). The test code includes for example one or more test patterns and one or more test algorithms to be applied to the instruments of the DUT. In an example, the test patterns are defined by using level 0 POL, and the test algorithms are defined by using level 1 POL, and include code written in a high-level language such as Tcl or similar. However, the term "test code" is used here to designate not only code that includes the test patterns and the test algorithms, but also executable code in order to implement the test, as shall be described in more detail hereinafter.

The test code is for example in a format that is independent of the interface between the TGT 302 and the DUT. For example, the TGT 302 includes a memory that stores data defining an abstract interface (ABSTRACT INTERFACE) 306, and in particular an abstract format to be used for the test code.

FIG. 3B diagrammatically shows a portion 300B of the test apparatus which for example connects the TGT 302 to the DUT 102. It is assumed in this example that the test code is executed by the TGT 302, in other terms that the same device generates and executes the test code. However, in alternative embodiments, separated devices could be used to generate and execute the test code, with the execution being carried out by any test device.

As is shown in FIG. 3B, the communications to the DUT 102 generated by the execution of the test code 308 are for example supplied by the intermediary of an abstract API (application programming interface) to an interface controller (INTERFACE DRIVER) 310. As is known to those skilled in the art, an API in an application provides an interface between a program written in a high-level language and routines or functions that execute the desired operations. These routines can be implemented in the same language or in a different language, and can be contained in a package of precompiled modules in the form of executable code or object code.

The interface controller 310 converts for example communications from the abstract format used by the test code into a format that is suitable for the interface between the TGT 302 and the DUT 102. Similarly, the interface controller 310 converts for example the communications coming from the DUT 102 into the abstract format used by the TGT 302. The interface controller 310 is for example implemented by a separate circuit in relation to TGT 302, although in alternative embodiments the functions of the interface controller can be implemented by code executed by one or more processors of the TGT 302.

The interface controller 310 is coupled to the test controller 106 by the intermediary of a specialised API interface, the specialised interface in the example of FIG. 3B being for example a JTAG interface. The test controller 106 is coupled to the integrated circuit 101 by the intermediary of the interface 108. As in FIG. 1, the integrated circuit 101 includes for example a TAP 104 in order to interface with the DUT 102, although in alternative embodiments the TAP 104 can be a chip that is separate from the DUT 102.

The execution of the test code 308 by the TGT 302 causes for example the application of test patterns and of test algorithms to the DUT 102 via the interface controller 310 and the test controller 106, and data returned by the DUT 102 is for example supplied in return to the TGT 302 so that it can be interpreted. In particular, the execution of a test code results in the implementation of a test algorithm, and can cause the generation of output data (TEST OUTPUT) 312.

In certain embodiments, configuration information (CONFIGURATION) 314 is provided to the device executing the test code 308, and for example indicates the type of interface, thus making it possible to select a suitable interface controller to be used during the test phase. For example, the test device includes one or more other interface controllers 310' for controlling different types of interfaces, and the test device selects a suitable interface controller 310, 310' based on configuration information 314.

An advantage of providing the test code in an abstract format which is independent of the interface between the TGT 302 and the DUT 102 is that the execution of this test code can be relatively fast since the particular interface format does not need to be taken into account by the TGT 302. Furthermore, the communications with the DUT 102 are managed by the interface controller 310, which allows for an operation in parallel between the TGT 302 and the interface controller 310. This means that the TGT 302 is not obliged to wait for a communication with a given instrument of the DUT 102 to be receives and processed by the DUT 102 before continuing to execute the test code concerning other instruments of the DUT 102.

A test method of a DUT that uses the test apparatus of FIGS. 3A and 3B shall now be described in more detail in reference to FIG. 4.

Figure 4:
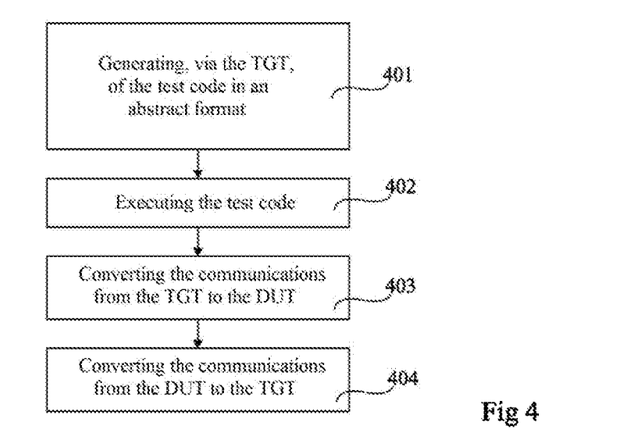
FIG. 4 is a flowchart showing steps in a method of applying an automatic test to an integrated circuit.

FIG. 4 is a flowchart showing steps in a test method of a DUT according to an embodiment.

This method is for example implemented by the TGT 302 and the interface controller 310 of the test apparatus of FIGS. 3A and 3B.

In a step 401, the TGT 302 generates the test code in an abstract format, which is independent of the interface that connects the TGT 302 to the DUT 102. The abstract format is for example an intermediate format between the format used by the TGT 302 and the format used by the interface with the DUT 302. The test code includes for example one or more test patterns and one or more test algorithms to be applied to instruments of the DUT. The generating of the test code is for example based on one or several elements among the DFT files 118, the circuit description 120, and fault models 122.

In a step 402, the test code is executed. For example, the test code includes test patterns and test algorithms wrapped in code which can be executed by the processors of the TGT 302, or more generally by processors of any test device used to execute the test code. In certain embodiments, the execution of the test code entails the application, in parallel, of a plurality of test algorithms to a corresponding plurality of test instruments of the DUT 102.

The execution of the test code also entails for example the construction of a test instrumentation test model of the DUT 102, defining the positions of the instruments in the analysis strings, and also the instrumentation status. The instrumentation status includes for example the status of the dynamic elements in the DUT, including segment insertion bits (SIB) and analysis multiplexors. Thus the test code itself does not include for example the system model, which may only be generated during the execution of the test code.

In a step 403, during the execution of the test code, the communications from the TGT 302 to the DUT 102 are converted by the interface controller 310 into a format that is suitable for the particular interface between the TGT 302 and the DUT 102. These communications include for example one or more test patterns to be applied to instruments of the DUT 102, and one or more test algorithms to be applied to instruments of the DUT 102.

In a step 404, the communications from the DUT 102 to the TGT 302 are converted by the interface controller 310 into the intermediate format so that they can be processed by the TGT 302. These communications include for example output test patterns of the DUT 102. These communications are for example used to update the status of the test instrumentation in the system model, which can then be used to generate other test patterns.

Examples of particular interfaces between the TGT 302 and the DUT 102 shall now be described in more detail in reference to FIGS. 5A to 5D.

Figure 5A:
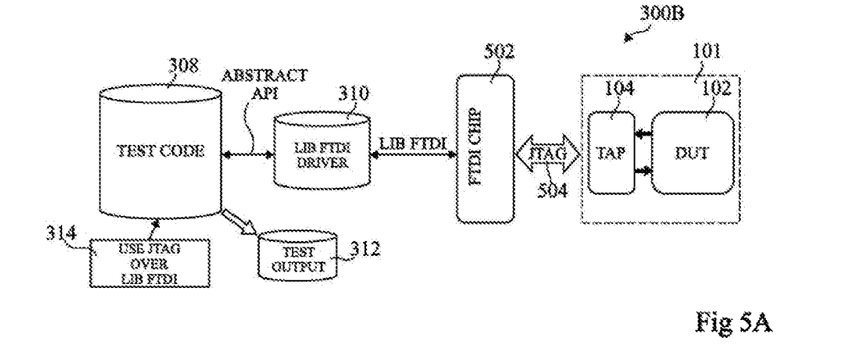
FIGS. 5A to 5D diagrammatically show different applications of the test apparatus of FIGS. 3A and 3B according to embodiments of the present description.

FIG. 5A diagrammatically shows the portion 300B according to an embodiment wherein the interface between the TGT 302 and the DUT 102 is provided by an FTDI chip (Future Technology Devices International Ltd) (FTDI CHIP) 502, which converts for example a USB (universal serial bus) interface into the JTAG interface (JTAG) 504. In this embodiment, the interface controller 310 includes for example a LibFTDI drivers (LIB FTDI DRIVER), which is for example low-level code used to control the FTDI chip 502, and the configuration information 314 identifies for example this LibFTDI driver so that it can be selected for the conversion.

Figure 5B:
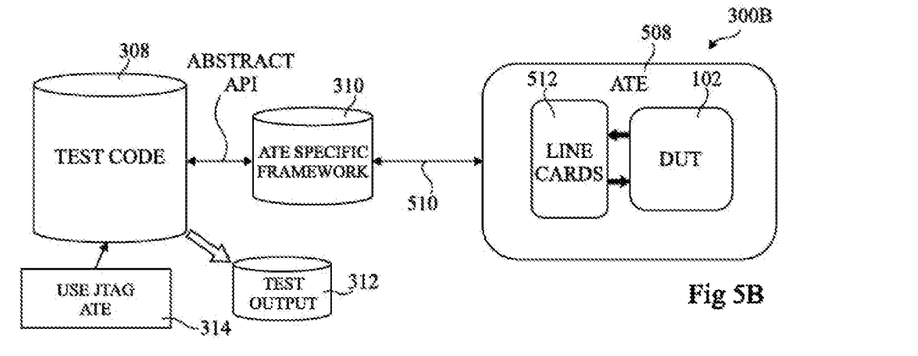

FIG. 5B diagrammatically shows the portion 300B of the test apparatus according to an alternative embodiment with respect to FIG. 5A wherein the DUT 102 is accessed by the intermediary of an Automated Test Equipment (ATE) 508, such as is commonly used in manufacturing. In such a case, the interface between the TGT 302 and the DUT 102 is for example implemented by a high-speed interface 510, for example an optical fibre interface, controlled by an interface controller 310 that includes an ATE specific framework (ATE SPECIFIC FRAMEWORK) that communicates with line cards (LINE CARDS) 512, which are responsible for the physical interface with the DUT 102.

Figure 5C:
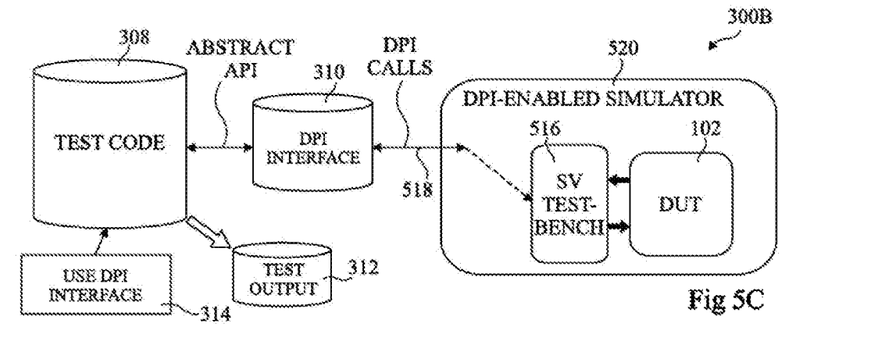

FIG. 5C diagrammatically shows the portion 300B of the test apparatus according to an alternative embodiment with respect to FIGS. 5A and 5B wherein the DUT is simulated. In this case, the DUT 102 is for example implemented by using a hardware description language, such as the VHDL language (VHSIC (Very High-Speed Integrated Circuit) Hardware Design Language) or Verilog, and the simulation is controlled by a high-level testbench SV VERILOG 516. In this example, the testbench is implemented by using the HDL SystemVerilog (SV). The interface between the TGT 302 and the DUT 102 is done by the intermediary of a DPI (Direct Programming Interface), that implements the interface controller 310, and by DPI calls 518, and the DUT 102 is accessed by using a DPI-enabled simulator (DPI-ENABLE SIMULATOR) 520 including the testbench SV (SV TESTBENCH) 516.

Figure 5D:
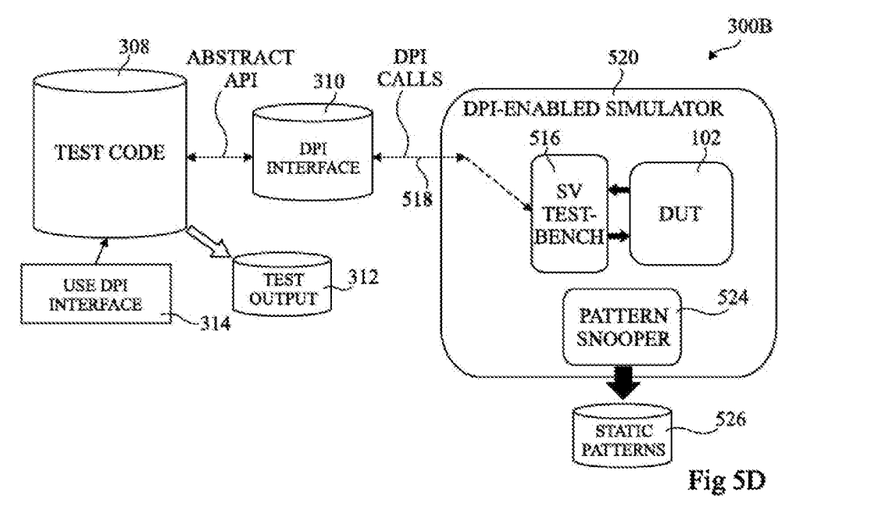

FIG. 5D diagrammatically shows the portion 300B of the test apparatus according to an embodiment similar to the one of FIG. 5C, wherein the DPI-enabled simulator 520 further includes a pattern snooper (PATTERN SNOOPER) 524. The pattern snooper 524 makes it possible for example to extract static patterns (STATIC PATTERNS) 526 from the DUT 102 and to deposit them in a known format. The interest of such an embodiment is that the operation becomes similar to that of a conventional ATPG (automatic test pattern generation) system, and thus the test device of FIG. 5D is retro-compatible. Instead of using a DPI-enabled simulator 520, this embodiment could be implemented by using an emulation, without the simulator, in order to supply a pattern without temporal elements with a lower computing effort.

An advantage of the test device described here is that it becomes possible to apply, by using the TGT 302, relatively complex test algorithms for testing specific circuits of the DUT 102. For example, in the past, circuit testing implemented complex functions such as the fast Fourier transform (FFT), or cryptographic functions, that required the use of a dedicated BIST (Built-In Self-Test), consuming precious space on the chip. The TGT 302 is for example capable of generating test code that includes code implementing such complex test algorithms, or which include function calls to libraries storing the code in order to execute such complex test algorithms, such as shall now be described in reference to FIGS. 6, 7A and 7B.

Figure 6:
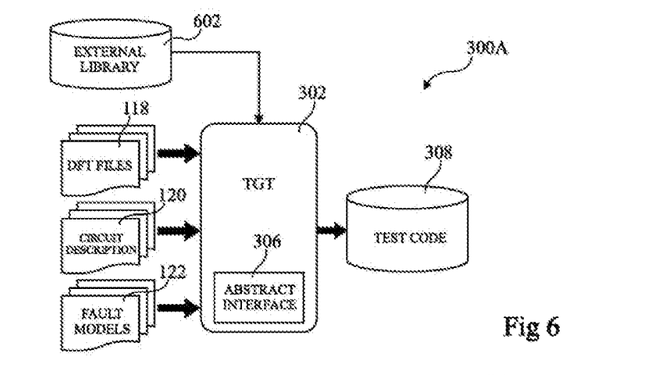
FIG. 6 diagrammatically shows a test generation tool according to another embodiment.

FIG. 6 shows the module for generating and for executing test code 300A according to another embodiment similar to the one of FIG. 3A but wherein it further includes an external library (EXTERNAL LIBRARY) 602 coupled to the TGT 302. This external library 602 stores for example complex test algorithms that can be applied to instruments of the DUT.

Figure 7A:
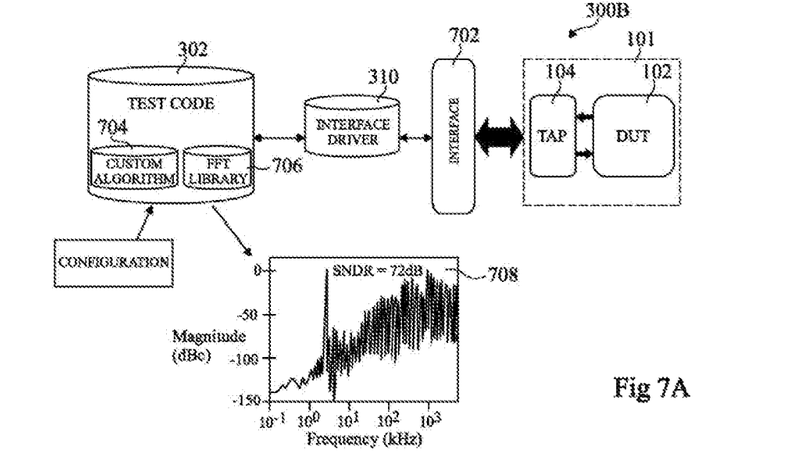
FIG. 7A diagrammatically shows the portion of the test apparatus of FIG. 3B adapted to test an FFT function (fast Fourier transform) according to an embodiment of the present description.

FIG. 7A diagrammatically shows an example wherein the DUT 102 includes an FFT circuit that implements the FFT function (not shown), and includes an instrumentation that supplies a test interface with this FFT circuit. The external library 602 of FIG. 6 includes for example an FFT library defining test sequences for testing the FFT function and validating the response at the output. A specialised algorithm (CUSTOM ALGORITHM) 704 is for example incorporated into the test code 308 in order to implement the complex test algorithm of the FFT. Furthermore, the FFT library 706 is for example incorporated into the test code in order to be accessible during the test phase. As it is shown, the output of raw data from the FFT circuit of the DUT 102 can provide a complex waveform 708 that indicates in this example the amplitude of the output signal according to the frequency of the input signal, and the specialised algorithm 704 and the library 706 can allow for such a waveform to be validated by the TGT 302.

Figure 7B:
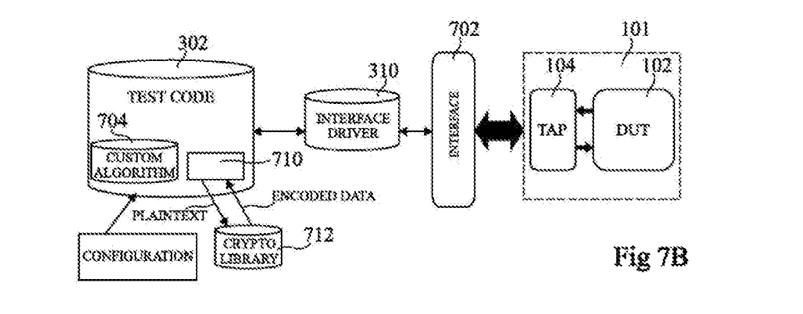
FIG. 7B diagrammatically shows the portion of the test apparatus of FIG. 3B adapted to test a cryptographic function according to an embodiment of the present description.

FIG. 7B diagrammatically shows another example wherein the DUT 102 includes a cryptographic circuit that implements a cryptographic function (not shown), and includes an instrumentation that supplies a test interface with this cryptographic circuit. In such a case, the external library 602 of FIG. 6 includes for example a cryptographic library. In addition to a specialised algorithm 704, the test code 308 of FIG. 7B includes for example a function call 710 to the cryptographic library 712 in order to allow the cryptographic function to be executed, and through this to make it possible to verify the correct operation of the cryptographic circuit. In particular, the cryptographic library receives for example simple text via the function call 710, and returns coded data to the function call 710. Instead of this or in addition, the cryptographic library 712 could carry out a decryption operation, and could receive encrypted data from the function call 710, and return simple text to the function call 710.

Although at least one illustrating embodiment has been described, various alterations, modifications and improves will appear easily to those skilled in the art. For example, it will appear clearly to those skilled in the art that, although embodiments have been described wherein the TGT generates and executes the test code, in other embodiments the execution of a test code could be carried out by a device separate from the TGT.

Furthermore, it will appear clearly to those skilled in the art that although certain examples of complex test algorithms for testing a FFT circuit have been described, the same principles could be applied to other types of circuits to be tested, such as any data or signal processing algorithm, or any analogue circuit, such as an analogue-digital converter.

The invention claimed is:

1. A test apparatus for testing a device being tested, the test apparatus comprising:
   a test device including a memory for storing data processing instructions and one or more processors configured, when the data processing instructions are executed:
   to execute test code in order to implement a test operation on the device being tested, the test code defining one or more test patterns and one or more test algorithms to be applied to instruments for testing the device being tested, the test code being in a first format that is independent of the test interface between the test device and the device being tested; and
   an interface controller coupled to the device being tested and configured to convert communications generated by the test device during the execution of the test code into a second format suitable for the test interface, and to convert communications from the device being tested into the first format.

2. The test apparatus according to claim 1, further comprising a plurality of interface controllers implemented by the one or more processors of the test device or by another device, wherein the test device is configured to select one from the plurality of interface controllers in order to carry out the conversion.

3. The test apparatus according to claim 1, wherein one or more processors of the test device, or one or more other processors of a test generation tool, are configured to generate the test code before the execution of the test code by the test device.

4. The test apparatus according to claim 1, further comprising the test interface coupling the interface controller to the device being tested.

5. The test apparatus according to claim 1, wherein the test device is configured to carry out an execution in parallel of a first test algorithm applied to a first of the test instruments and a second test algorithm applied to a second of the test instruments.

6. The test apparatus according to claim 1, wherein the one or more processors of the test device are further configured to access an external library defining one or more other test algorithms for testing a sub-circuit of the device being tested.

7. The test apparatus according to claim 6, wherein the one or more processors of the test device are configured to generate the test code by incorporating the external library into the test code and/or by incorporating into the test code a function call to the one or more other test algorithms.

8. The test apparatus according to claim 6, wherein the sub-circuit implements a data or signal processing function, and wherein the one or more other test algorithms are configured to verify an expected behaviour of the data or signal processing function.

9. The test apparatus according to claim 6, wherein the sub-circuit implements a cryptographic function, and wherein the one or more other test algorithms are configured to provide encryption and/or decryption operations so as to allow the test generation tool to verify the behaviour of the cryptographic function.

10. A test system comprising:
    the test apparatus of claim 1; and
    the device being tested coupled to the test apparatus, the device being tested including a test access port and a plurality of test instruments, with each test instrument including one or more analysis registers.

11. A method for testing a device being tested, the method comprising:
    executing, by a test device including a memory for storing data processing instructions and one or more processors configured, of the test code in order to implement a test operation on the device being tested, the test code defining one or more test patterns and one or more test algorithms to be applied to the test instruments of the device being tested, the test code being in a first format that is independent of the test interface between the test generation tool and the device being tested; and
    during the test operation:
    converting communications generated by the execution of the test code and intended for the device being tested into a second format adapted to the test interface; and converting communications coming from the device being tested into the first format.

12. The method according to claim 11, further comprising, before the execution of the test code, generating of the test code by the test device, or by one or more other processors of a test generation tool.

13. The method according to claim 11, further comprising implementation of a plurality of interface controllers by the one or more processors of the test device or by another device, and selecting, by the test device, of one from the plurality of interface controllers in order to carry out the conversions.

14. The method according to claim 11, further comprising carrying out by the test device of an execution in parallel of a first test algorithm applied to a first of the test instruments and of a second test algorithm applied to a second of the test instruments.

* * * * *